March 8, 1949. W. J. BRETH 2,464,020
TIRE BUILDING MACHINE
Original Filed June 14, 1944 5 Sheets-Sheet 1

INVENTOR
WALTER J. BRETH
BY Evans & McCoy
ATTORNEYS

INVENTOR
WALTER J. BRETH

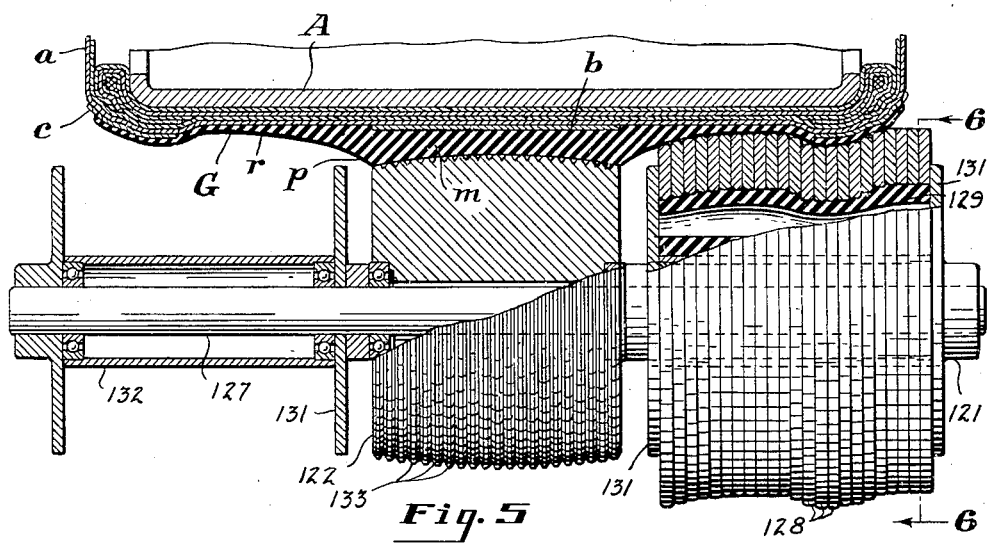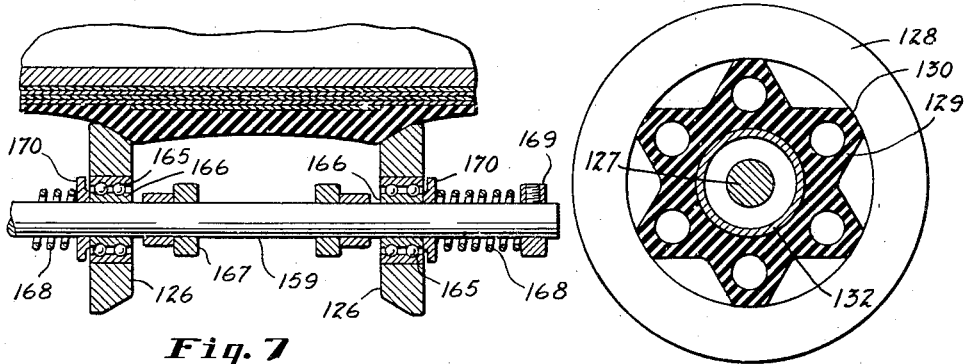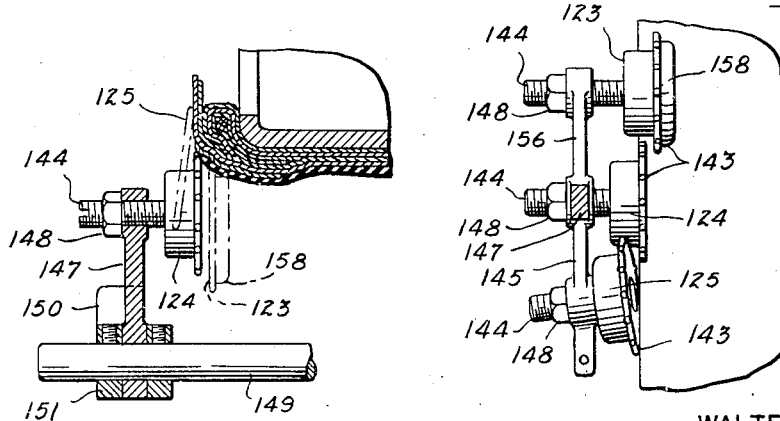

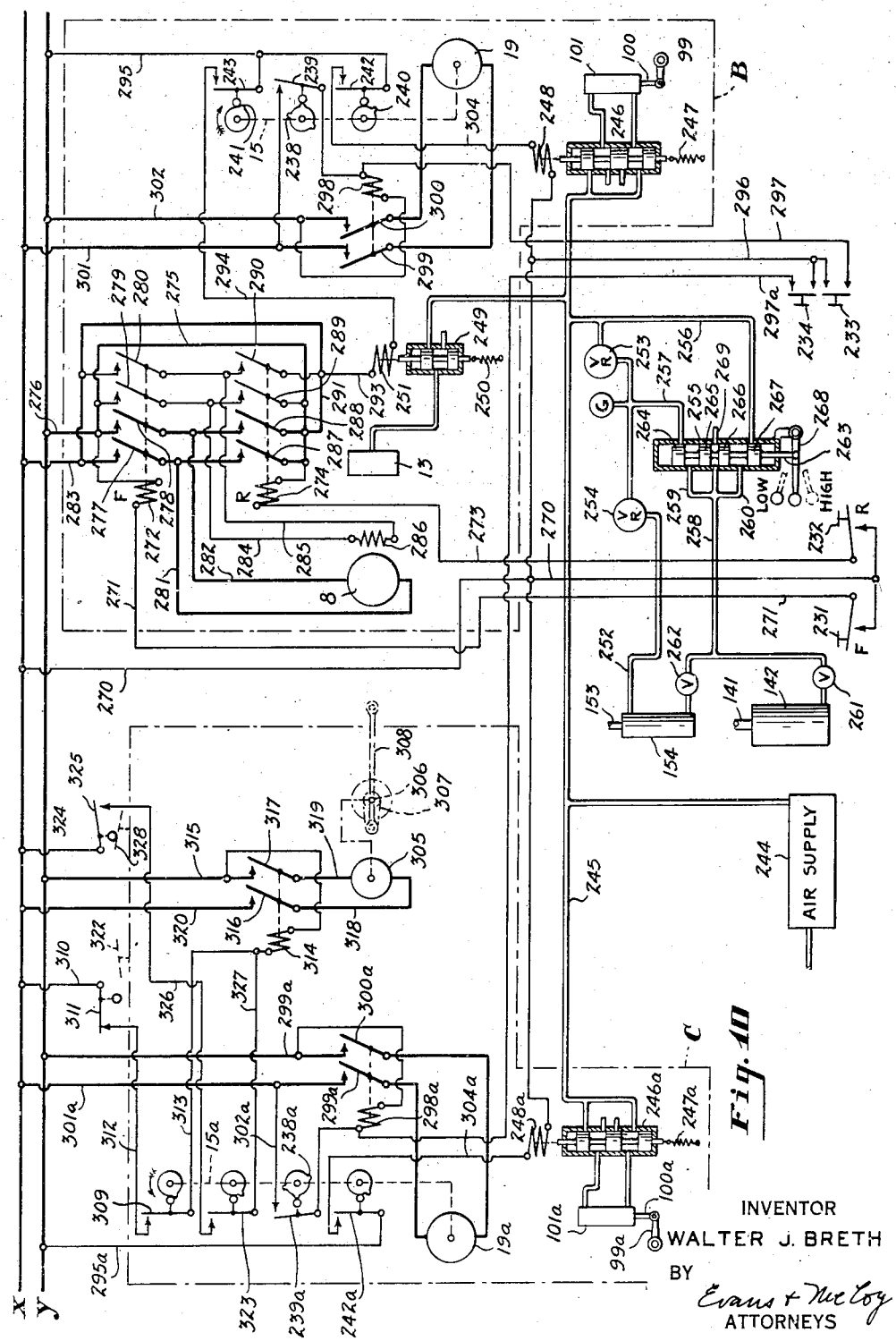

Patented Mar. 8, 1949

2,464,020

UNITED STATES PATENT OFFICE 2,464,020

TIRE BUILDING MACHINE

Walter J. Breth, Akron, Ohio, assignor to The General Tire & Rubber Company, Akron, Ohio, a corporation of Ohio Original application June 14, 1944, Serial No. 540,306. Divided and this application March 9, 1945, Serial No. 581,873

17 Claims. (Cl. 154—9)

This invention relates to a tire building machine of the drum type, the present application being a division of my copending application Serial No. 540,306, filed June 14, 1944, now Patent No. 2,455,038, November 30, 1948.

This invention has for its object to provide an improved means for applying the rubber covering to fabric plies previously placed upon a drum and improved means for compacting the tire body and firmly affixing together the fabric plies and rubber cover stock.

An additional object of the invention is to provide actuators for the stock applying and tire compacting rollers, together with controlling means by which the rollers may be brought into engaging position in the proper sequence and applied with the proper pressures.

A further object of the invention is to provide means for compacting the tire body and for simultaneously stitching the edge portions of the outer layers of tire fabric to the exterior of the tire beads.

With the above and other objects in view, the invention may be said to comprise the tire building machine as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Fig. 5 is a section taken on the line indicated at 5—5 in Fig. 4, showing the main pressure rollers engaging the rubber cover stock;

Fig. 6 is a transverse section through one of the deformable pressure rollers taken on the line indicated at 6—6 in Fig. 5;

Fig. 7 is a fragmentary section taken on the line indicated at 7—7 in Fig. 4 showing the tread-shaping rollers in engagement with the shoulders of the tread portion of the tire;

Fig. 8 is a fragmentary plan view of the bead stitching rollers viewed as indicated at 8—8 in Fig. 4;

Fig. 9 is a section taken on the line indicated at 9—9 in Fig. 4, showing the bead stitching rollers engaging the external fabric plies overlying the bead rings, and Fig. 10 is a combined wiring and fluid pressure diagram showing the means by which the various operations performed by the machine are controlled.

Figure 1:
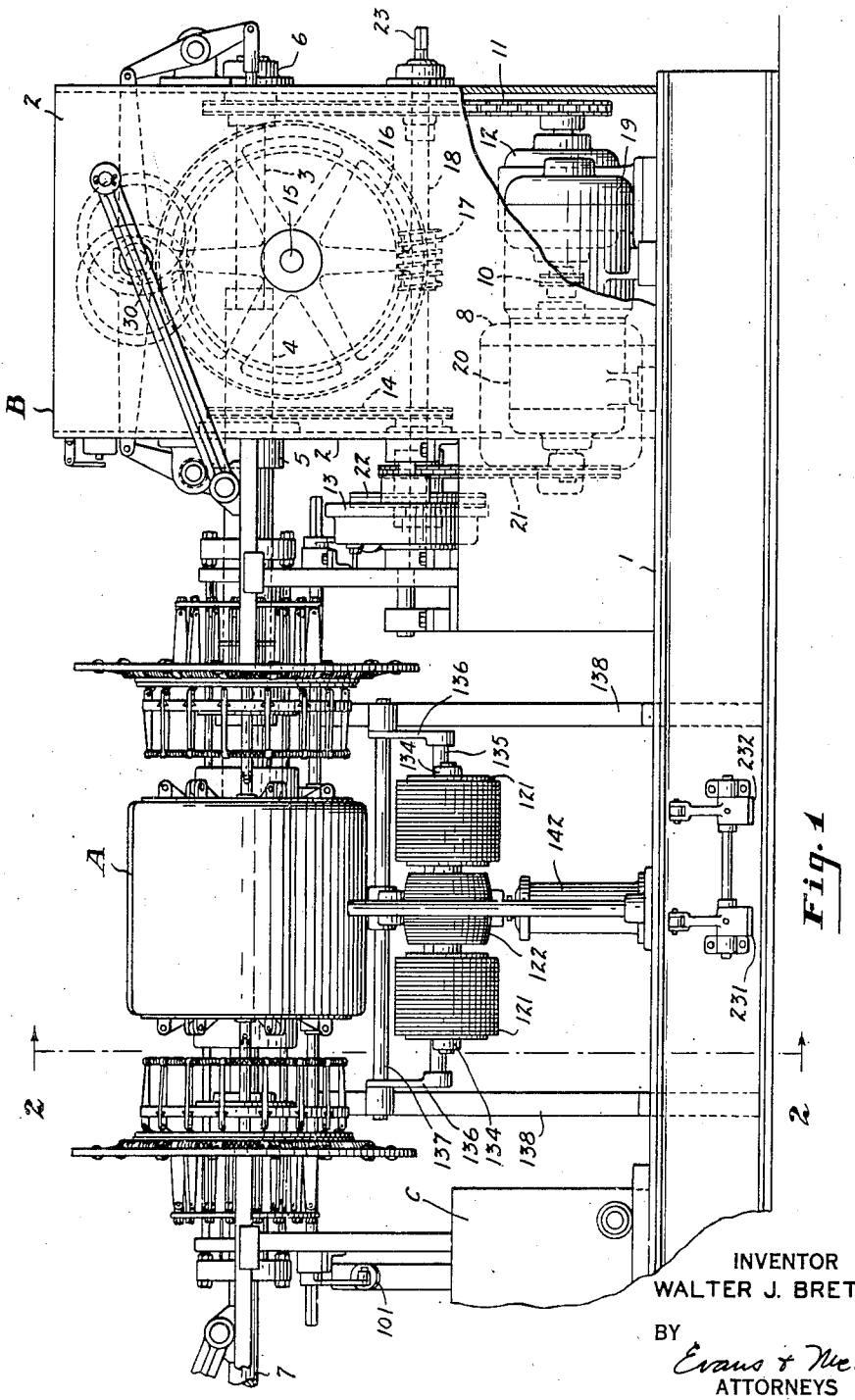
Fig. 1 is a fragmentary front elevation of a tire building machine embodying the invention, showing the tire building drum together with the stationary and movable bead building heads associated therewith.

The present invention is shown embodied in a tire building machine that consists of a centrally disposed, collapsible tire building drum A which is rotated while certain of the tire building operations are being performed and held stationary during the performance of other tire building operations and which may be of the usual and conventional construction, together with a stationary bead building head B and a movable bead building head C which serve to apply bead rings to fabric at the ends of the drum and to shape the bead portions of the tire while the drum is stationary, the arrangement being similar to that disclosed in my Patent 2,313,035 granted March 9, 1943.

The machine of the present invention is mounted upon an elongated base 1, upon which the head B and the drum A are mounted in fixed positions, and upon which the head C is slidably supported for movement axially toward and away from the drum A. The actuating and control mechanism of the head B is mounted within a housing 2 having vertical inner and outer and side walls. The drum A, which is composed of collapsible segments, is supported on a shaft 3 and a sleeve 4 on the shaft 3; the segments of the drum being connected by suitable links to the sleeve and shaft so as to be expanded or collapsed by relative rotary movements of the sleeve and shaft. Since this construction is conventional for tire building drums, the linkage is not herein illustrated.

The supporting shaft 3 is mounted in bearings 5 and 6 in the inner and outer walls of the housing 2, and has interfitting engagement with an axially aligned shaft 7 on the movable head C. The shaft 3 is driven by an electric motor 8 mounted on the base 1, the shaft 3 being connected to the motor 8 through sprocket chains 10 and 11 and an interposed reduction gearing in a housing 12, the reduction gearing being driven by the motor through the chain 10 and the shaft 3 being driven from the reduction gearing through the chain 11. In order to cause relative rotation of the shaft 3 and sleeve 4 to collapse the drum, an air brake 13 is connected by a sprocket chain 14 to the sleeve 4. Upon application of the brake 13, the sleeve 4 is held against rotation, whereupon continued rotation of shaft 3 in one direction or the other will expand or collapse the drum.

A transverse actuating shaft 15 is journaled in the side walls of the housing 2, and this shaft has a worm wheel 16 attached thereto that meshes with a worm 17 on a longitudinal shaft 18 journaled in the inner and outer walls of the housing. The moving parts of the bead building head are actuated by the shaft 15, which is driven by an electric motor 19 through reduction gearing in a housing 20 and a sprocket chain 21 extending to the shaft 18.

The moving parts of the bead building head B are actuated by the shaft 15 and it is desirable that the rotation of this shaft be stopped upon excessive resistance to movement of any of these parts. The shaft 18 is, therefore, driven through a slip clutch 22 interposed between the sprocket chain 21 and the shaft 15. The shaft 18 preferably projects through the outer wall of the housing 2 and has a squared end 23 adapted to receive a hand crank by which the shaft may be turned manually to adjust the moving parts when desired.

During operation of the machine the drum A is rotated by means of the motor 8 under the control of the operator for the application of layers of fabric and rubber thereto and during the compacting and stitching operations while the bead building heads B and C are held in retracted positions.

After the bead rings have been built into the tire carcass fabric, the bead building mechanisms are stopped with their retracted positions clear of the drum and external plies of fabric and rubber are applied to the fabric previously placed on the drum.

Figure 3:
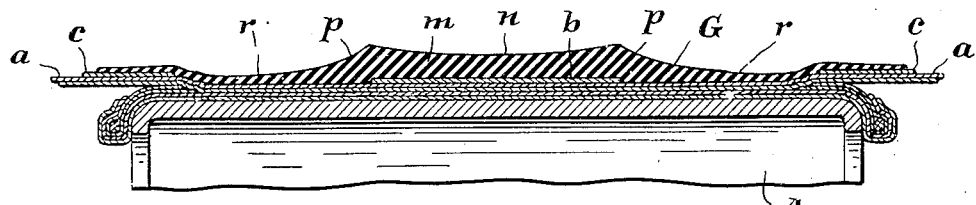
Fig. 3 is a fragmentary sectional view showing the external plies of fabric and rubber applied to the interior portion of the tire previously formed on the drum.

The external fabric plies are built up upon the inner fabric plies in the usual manner by rotating the drum and winding the strips of fabric forming the successive plies upon the drum. The fabric plies as shown in Fig. 3 comprise a suitable number of full width plies $a$, a breaker strip $b$ and chaffer strips $c$. The external rubber covering of the tire is formed by a strip of rubber stock G that has a thickened tread portion $m$ provided with a concave face $n$ and inclined shoulder portions $p$, together with side wall covering portions $r$ that gradually decrease in thickness toward the edges of the strip.

Figure 2:
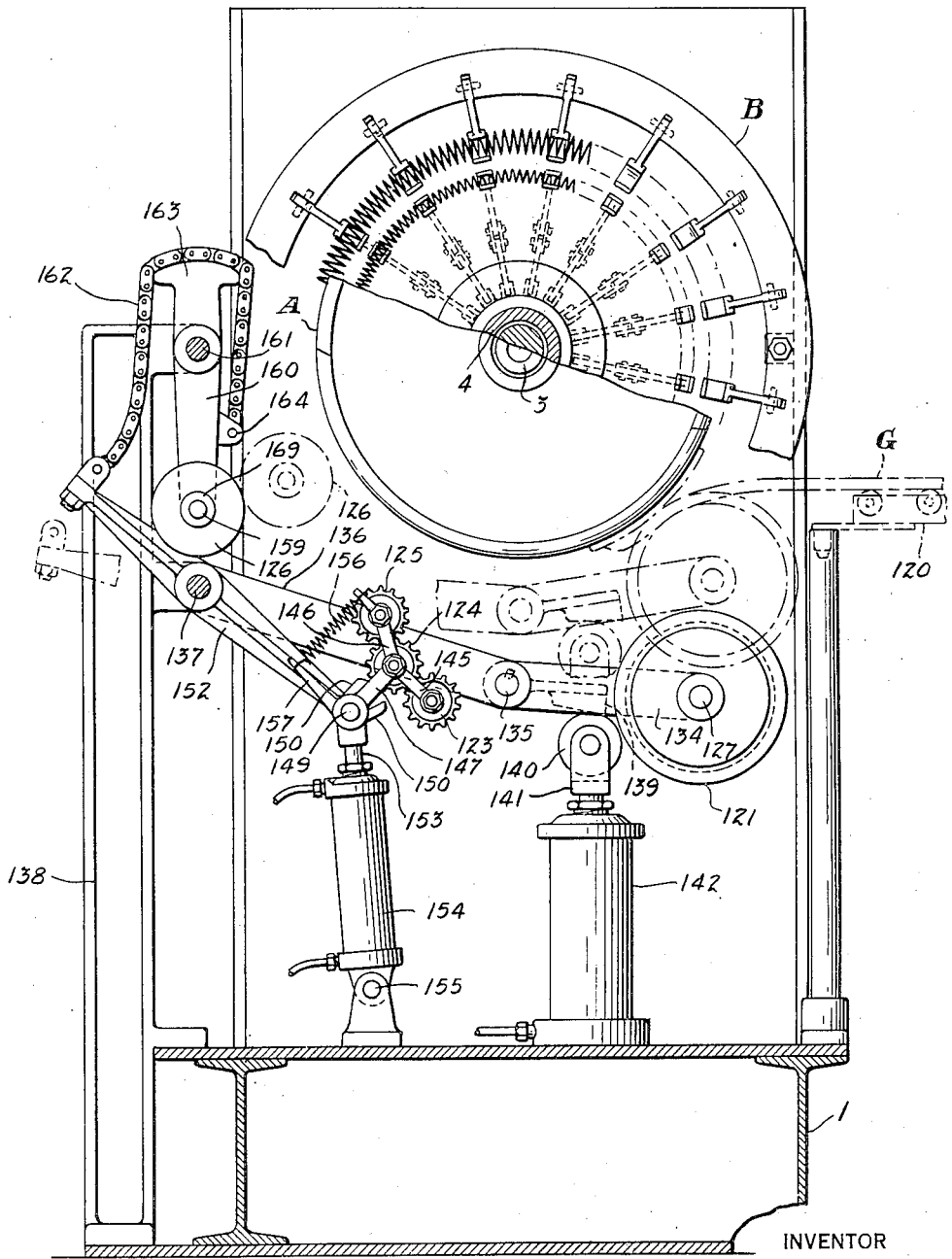
Fig. 2 is a vertical transverse section through the machine taken on the line indicated at 2—2 in Fig. 1 and showing the pressure roll supports and actuators in side elevation.

As shown in Fig. 2, a strip of rubber stock G that is cut to the proper length to form the covering of the tire is fed to the tire building drum from a suitable support such as a table 120 mounted at the front of the machine. Viewed as in Fig. 2, the drum A is rotated in a clockwise direction and the strip G passes from the table 120 to the under side of the drum A where it is engaged by a set of compression rollers which as shown in Fig. 5, comprise two deformable end rollers 121 and a center roller 122 that has a transversely convex periphery, the deformable rollers 121 engaging the side wall portions $r$ of the rubber covering and the convex center roller engaging the concave face $n$ of the thickened tread portion.

Rearwardly of the pressure rollers, stitching rollers 123, 124 and 125 are provided at each end of the drum that serve to press the edge portions of the strip G and of the fabric plies against the inner layers of fabric adjacent the beads, and to fold the fabric inwardly against the outer faces of the beads. To the rear of the stitching rollers there is a pair of shoulder engaging pressure rollers 126, adapted to engage the tread shoulder portions $p$.

The pressure rollers 121 and 122 are mounted upon a transverse shaft 127 and each of the deformable rollers 121 has a yieldable periphery formed by a series of annular disks 128 that are mounted side by side for relative radial movements throughout the length of the roller. The annular disks 128 are mounted upon a soft rubber core 129 of star shape that has projecting tips 130 upon which the annular disks 128 are seated. The disks 128 are confined between end plates 131 which engage the ends of a cylindrical sleeve 132, upon which the rubber core 129 is mounted. The transversely convex periphery of the roller 122 fits the concave face $n$ of the tire tread, and the periphery of this roller has closely spaced V-shaped ribs 133 formed between closely spaced V-shaped circumferential grooves in the periphery of the roller. The rollers 121 and 122 are rotatably mounted upon the shaft 127, and are turned during operation by frictional engagement with the stock on the tire building drum.

As shown in Figs. 1 and 2, the shaft 127 is supported upon the outer ends of a pair of arms 134, that are keyed at their inner ends to a shaft 135, which is non-rotatably secured at its ends to the outer ends of arms 136 that are pivoted at their inner ends to a horizontal shaft 137, journaled in posts 138 mounted on the base 1 rearwardly of the drum. The arms 134 and 136, together with the shafts 127 and 135 form a rigid supporting frame that swings vertically about the horizontal shaft 137 to move the pressure rollers 121 and 122 into and out of engagement with stock on the tire building drum.

Immediately to the rear of the pressure rollers 121 and 122, the arms 134 are connected by a rigid cross bar 139, the bottom face of which contacts with a roller 140 on the upper end of a plunger 141 that operates in a vertically disposed cylinder 142 mounted on the base 1. The cylinder 142 is adapted to receive air under pressure to force the plunger 141 upwardly to engage the rollers 121 and 122 with material on the drum A, and to maintain a pressure upon these rollers. The inclination of the bottom face of the bar 139 is such that this face is substantially horizontal when the rolls are brought into engagement with the stock being fed to the tire building drum, so that pressure may be effectively applied to the roller by the plunger 141. It will be noted that the rollers 121 are disposed forwardly of the central vertical plane of the drum, so that pressure of these rollers against the incoming strip G maintains a tension on the strip as it is applied to the drum. Shrinkage of the cover stock during storage prior to use shortens the strip and thickens the tread forming portions thereof, so that it is difficult to properly adhere the side wall covering portions to the fabric and difficult to properly splice the ends of the strip together. By properly regulating the tension exerted on the strip by the roller 122 during its application to the fabric on the drum, the strip G may be caused to be uniformly adhered to the underlying fabric throughout the width and circumference of the tire, and the stock may be stretched exactly to the extent necessary to obtain the proper engagement of the skived ends of the strip.

Figure 4:
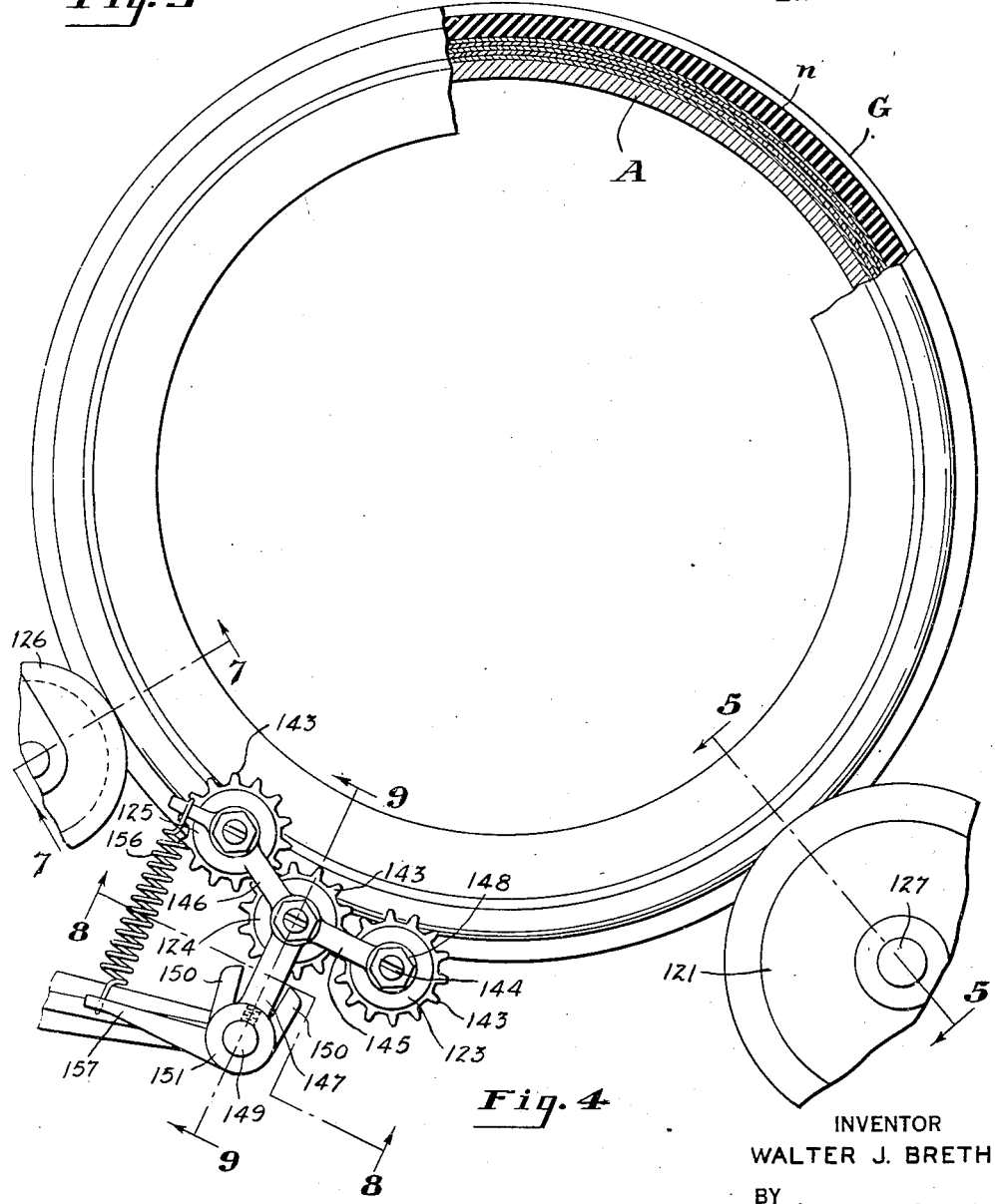
Fig. 4 is a diagrammatic end elevation showing the pressure and stitching rollers engaging the rubber cover stock and the external fabric plies.

As shown in Figs. 4, 8 and 9, the stitching rollers 123, 124 and 125 have toothed flanges 143, which engage with the outer plies of fabric along the shoulders of the drum. Each of the rollers 123, 124 and 125 is mounted upon a threaded shaft 144 that is screwed into a supporting spider that has three integral arms 145, 146 and 147. As shown in Fig. 8, the roller 123 is mounted at the outer end of the arm 145, the roller 124 is mounted at the juncture of the three arms 145, 146 and 147 and the roller 125 is mounted at the outer end of the arm 146. The shafts 144 are secured in adjusted positions by means of nuts 148 on the shafts 144 that screw into engagement with the supporting spider and the lower end of the arm 147 of the spider is pivotally mounted on a horizontal supporting shaft 149. The pivotal movement of the arm 147 on the shaft 149 is limited by a pair of stops 150 carried by a collar 151 fixed to the shaft 149 and positioned in the path of the arm 147. The shaft 149 is carried by the outer ends of lever arms 152 that are pivoted intermediate their ends to the shaft 137 and the upper end of a plunger 153 is also pivotally connected to the shaft 149, the plunger 153 being mounted in a fluid pressure cylinder 154 connected to the base 1 by a horizontal pivot 155. By means of the cylinder 154, the stitching rollers may be moved upwardly into engaging position and pressed against the shoulder of the drum. Pivotal movements of the arm 147 permit the stitching rollers to adjust themselves to the drum and equalize the pressure of the rollers against the drum. The arm 147 is normally yieldingly held in engagement with the rear stop 150 by a coil spring 156 that is connected at one end to the outer end of the arm 146 and at the other end to an arm 157 attached to the collar 151. The rear stop 150 is so positioned that the spring 156 holds the roller supporting spider in a position such that the roller 123 is first engaged with the stock on the drum when the shaft 149 is elevated so that pressure on the roller 123 rocks the rollers 124 and 125 into engaging position. The stops 150 are so positioned that the arm 147 is substantially midway between the stops during engagement with the fabric on the drum, so that the roller support is free to rock in either direction to equalize the pressure on the rollers. As shown in Figs. 8 and 9, the front roller 123 has a shoulder portion 153 that bears against the edge of the rubber cover strip G inwardly of its flange 143. The intermediate roller 124 is offset axially outwardly with respect to the roller 123 and its flange engages the outer chaffer strip and presses the same radially inwardly against the bead, while the roller 125 is offset axially outwardly with respect to the roller 124 and positioned with its axis at an inclination to the drum axis and with its flange 143 pressing against the outer face of the tire bead. The teeth of the stitcher rollers engage the fabric at closely spaced points and cause the disks to turn with a peripheral speed equal to that of the fabric surface that is engaged, thereby avoiding slippage and wiping action that would tend to wrinkle the fabric.

As shown in Fig. 7 the rollers 126 are of conical form so that their peripheries conform to the inclined tread shoulders $p$ which were not engaged by the rollers 121 and 122. Both rollers 126 are slidably mounted upon a horizontal shaft 159 that is mounted on the lower ends of lever arms 160 pivoted intermediate their ends to a shaft 161 extending between the upper ends of the posts 138. The lever arms 160 are operated to move the rollers 126 into engagement with stock on the tire building drum by means of chains 162 extending over toothed segments 163 at the upper ends of the arms 160 and attached to the same adjacent their lower ends by pins 164. The opposite ends of the chains 162 are attached to the rear ends of the lever arms 152 so that the rollers 126 as well as the rollers 123, 124 and 125 are moved toward the drum by means of the fluid pressure cylinder 154. When the plunger 153 is actuated, the forward end of the lever 152 is moved upwardly and carries the stitching rollers 123, 124 and 125 into engaging position. At the same time the rear end of the lever 152 moves downwardly, exerting a pull on the chain 162 that swings the lever 160 forwardly and upwardly to press the rollers 126 into engagement with the tread portion of the tire on the drum. As shown in Fig. 7, the rollers 126 are mounted on ball bearings 165, which have inner races 166, slidable on the shaft 159. The inward movement of the rollers 126 is limited by stops 167 secured to the shaft 159 and the rollers are yieldingly pressed toward the stops 167 by coil springs 168 that are interposed between collars 169 attached to shaft 159 and disks 170 that are slidable upon the shaft and in engagement with the races 166. During operation a yielding inward pressure is applied by the springs 156 to the rollers 126, so as to hold the rollers in engagement with the inclined portions $p$ of the tire tread, the springs permitting the rollers 126 to accommodate themselves to treads of varying widths.

In applying the cover stock G to the fabric on the drum only the pressure rolls 121 and 122 are engaged with the stock, the delivery of pressure to the cylinders 142 and 154 being so controlled that the rolls 121 and 122 only are pressed against the stock. When the drum has nearly completed its revolution and the attached end of the stock is approaching the pressure rollers, the drum is stopped and then turned in a reverse direction until the ends to be spliced are brought up to a convenient position for the operator to manually join the ends together. When starting with a new batch of cover stock the drum may be intermittently actuated toward the end of its rotation to slow down the operation sufficiently to enable the operator to regulate the pressure applied to the cylinder 142 in such manner as to impart the stretch necessary to cause the skived ends of the stock to come together in the proper abutting relation.

After the application of the cover stock to the fabric on the drum the stitching rollers 123, 124 and 125 and the shoulder engaging pressure rollers 126 are pressed against the stock on the drum while the drum is being rotated through three or four revolutions. The pressure rollers 121, 122 and 126 press the rubber cover stock against the outer ply of fabric and press the fabric plies together to cause the plies of fabric and the cover stock to firmly adhere. At the same time the stitching rollers 123, 124 and 125 press the fabric plies against the outer faces of the beads and against the underlying fabric plies outwardly of the beads.

As shown in Fig. 1 of the drawings, treadles 231 and 232 are provided on the base 1 in front of the drum for controlling the rotation of the drum, the motor being operated in one direction while one treadle is depressed and in the reverse direction when the other treadle is depressed. In applying the layers of fabric to the tire drum, the drum is rotated in the direction to carry the fabric over the top of the drum, while in applying the tread stock the drum is rotated in the opposite direction to carry the stock around the bottom of the drum.

As shown diagrammatically in Fig. 10, stop lugs 238 on the shaft 15 engage with a limit switch 239 to stop the actuating motor 19 of the head B and a similar switch 239a stops the operating motor 19a of the head C, one of the lugs 238 and its corresponding lug 238a being so positioned as to stop the motors 19 and 19a with the mechanisms of the two heads clear of the drum A for the application of the outer layers of fabric and rubber to the tire carcass.

The diagram in Fig. 10 shows diagrammatically the fluid pressure system for actuating the cylinders 101 and 101a that apply pressure to the interiors of the beads at one stage of the tire building operation, for actuating the cylinders 154 and 142 that apply pressure to the pressure rollers, and for actuating the brake 13 that holds the sleeve 4 to cause the drum to be collapsed or expanded. This view also shows the electrical circuits controlling the fluid pressure valves and the operating motors on both the stationary and movable heads. Parts on the movable head which correspond to parts on the stationary head are designated by the same reference numerals, with the letter a added.

Air under pressure for the fluid pressure devices above referred to, is supplied from a suitable reservoir 244 through a pipe line 245 that communicates with valves 246 and 246a, that control the delivery of pressure to the opposite ends of the cylinders 101 and 101a. Springs 247 and 247a normally hold the valves 246 and 246a in position to apply pressure to hold the plungers 100 and 100a retracted, the valves being operated to reverse the pressure in the cylinders 101 and 101a by means of solenoids 248 and 248a. The line 245 also communicates with a valve 249 that controls the admission of pressure to the brake 13. A spring 250 normally holds the valve 249 in closed position and a solenoid 251 is adapted to open the valve in opposition to the spring.

The pressure line 245 is connected to the upper end of the cylinder 154 through a pipe line 252 that has two pressure reducing valves 253 and 254 that may be adjusted to regulate the pressure delivered to the upper end of the cylinder 154 and to regulate the pressure in the portion of the line 252 between the two valves. The operation of the cylinders 142 and 154 is under the control of a regulating valve 255 of the spool type that controls the admission of fluid under pressure to the lower ends of the cylinders. The lower end portion of the valve 255 is connected to the pressure line 245 by a pipe line 256 and the upper end portion of the valve is connected to the pipe line 252 between the two pressure reducing valves 253 and 254 by a pipe line 257. A pipe line 258 is connected with the central portion of the valve and has branches 259 and 260 connected to the valve 255 at points spaced above and below the center thereof, below the connection of the pipe line 257 and above the connection of the pipe line 256 to the valve. Delivery of pressure to the lower ends of the cylinders 142 and 154 from the pipe 258 may be controlled by manually adjustable regulating valves 261 and 262 controlling the flow of fluid from the pipe 258 to the cylinders 142 and 154, which may be set to adjust the rate of delivery of fluid to the cylinders and the rate of movement of the plungers. The regulating valve 255 has a movable element 263 that has four spaced plunger portions 264, 265, 266 and 267, which control communication between the longitudinally spaced ports of the valve.

The movable element 263 is provided with a lever 268 for adjusting it axially. In the intermediate position of the lever 268, shown in full lines, the ports to which the pipe lines 256 and 257 lead are closed, and the pipe line 258 leading to the lower ends of the cylinders 154 and 142 is connected to atmosphere through a central exhaust port 269. In the uppermost position of the lever 268 the pipe line 257 is connected to the pipe line 258 through the branch 259. In the lowermost position of the lever 268 the pipe line 256 is connected to the pipe 258 through the branch 260.

The pressure delivered to the upper end of the cylinder 154 is reduced by the valves 253 and 254 and is lower than the pressure delivered to its lower end through the valve 255, the pressure actually applied by the cylinder 154 to the pressure rollers being the difference between the pressure applied to the lower end of the cylinder and the pressure applied to the upper end thereof. When the lever 268 is shifted upwardly from its neutral position, the pressure in the portion of the pipe line 252 between the reducing valves 253 and 254 is delivered to the lower ends of the cylinders 142 and 154. When the lever 268 is moved downwardly from its neutral position, full pressure from the line 245 is delivered to the lower ends of both cylinders 142 and 154. By moving the lever 168 up or down from its neutral position a relatively low or a relatively high pressure may be supplied to the cylinders 142 and 154. For example, the pressure in line 245 may be at one hundred pounds, the valve 253 may reduce the pressure to fifty pounds, and the second reducing valve 254 may reduce the pressure to thirty pounds, which pressure is applied continuously to the top of the plunger in the cylinder 154. When the lever 268 is moved to its uppermost position, fifty pound pressure will be delivered to the ends of both cylinders 142 and 154. When the lever 268 is moved downwardly the full pressure of one hundred pounds will be delivered to the two cylinders. With the fifty pound pressure the effective pressure of the cylinder 154 would be twenty pounds and with the one hundred pound pressure the effective pressure of the cylinder 154 would be seventy pounds. It will be understood that the valves 253 and 254 may be adjusted to vary the pressures delivered to the upper end of the cylinder 154 and to the lower ends of the cylinders 142 and 154, so that the desired variations in the applied pressure may be obtained.

By means of the controlling valve 255 a relatively low pressure may be applied to the pressure rollers while the cover stock is being wound onto the drum and a heavier pressure is applied during rotation of the drum after the ends of the cover stock have been spliced together, a lower pressure being applied to the stitching and tread shoulder forming rollers through the cylinder 154 than to the main pressure rollers through the cylinder 142.

One terminal of each of the treadle switches 231 and 232 is connected by a wire 270 to a power line x. The second terminal of the forward switch 231 is connected by a wire 271 to a control solenoid 272 by which the motor 3 may be caused to rotate in one direction. A wire 273 connects the second terminal of the reverse switch 232 to a control solenoid 274 by which the motor 8 may be caused to rotate in a reverse direction. The terminals of the solenoids 272 and 274 opposite those connected to the wires 271 and 273, are connected by a wire 275 and the wire 275 is connected to a power line *y* by a wire 276.

Energization of the solenoid 272 closes four normally open switches 277, 278, 279 and 280. Wires 281 and 282 connect the armature of the motor 8 to switches 277 and 278 which are connected by wires 276 and 283 to lines *y* and *x*. Wires 284 and 285 connect the switches 279 and 280 to opposite terminals of a field winding 286. The switch 279 is connected to line *y* through the wires 275 and 276 and the switch 280 is connected to line *x* through the wire 283.

The reverse solenoid 274, when energized closes four normally open switches, 287, 288, 289 and 290. The switch 287 is connected through the wire 281 to the motor armature and through the wires 275 and 276 to the line *y*. The switch 288 is connected through the wire 282 to the motor armature and through a wire 291 and the wire 283 to the line *x*. The switches 289 and 290 are connected to the terminals of the field winding 286 through the wires 284 and 285, the switch 289 being connected to line *y* through the wires 275 and 276, while switch 290 is connected to line *x* through the wires 291 and 283. The line connection of the switches 287 and 288 is the reverse of the switches 277 and 278 so that the flow through the armature of the motor 8 caused by the actuation of solenoid 274 is reverse to the flow due to the energization of the solenoid 272, so that the motor 8 is driven in one direction upon actuation of the switch 231 and in the opposite direction upon actuation of switch 232.

A wire 293 connects the wire 291 to the solenoid 251 which is connected by a wire 294 to the switch 243 controlled by the shaft 15, which is connected to the line *y* by a wire 295. When the actuating shaft 15 is in the position which it occupies when stopped after completion of the tire building operation, the switch 243 is in a closed position, so that the air brake 13 is applied and the drum A may be collapsed or expanded by rotation of the motor 8 in a forward or a reverse direction. A wire 296 is connected to the power line *x* through the wire 270 and to one terminal of each of the two switches 233 and 234. The opposite terminals of the switches 233 and 234 are connected by wires 297 and 297*a* to solenoids 298 and 298*a*. Solenoid 298 operates normally open switches 299 and 300 and solenoid 298*a* operates similar switches 299*a* and 300*a*. The switches 299 and 300 are connected to opposite terminals of the motor 19 and through wires 301 and 302 to the lines *x* and *y* the solenoid being also connected to the line *y* through the wire 302. The switches 299*a* and 300*a* are similarly connected to the motor 19*a* and to the lines *x* and *y*. Switch 239, which is the limit switch which controls the stopping of the motor 19, is immediately closed when the motor 19 is started. To maintain the circuit through the solenoid 298, the switch 239 when closed establishes a connection from the line *x* through the wire 301, solenoid 298 and wire 302 to line *y*.

Wires 304 and 304*a* connect the switches 242 and 242*a* to solenoids 248 and 248*a* that control the valves 246 and 246*a* through which pressure is admitted to the cylinders 101 and 101*a*. Upon closure of the switches 242 and 242*a* the current delivered to the solenoids 248 and 248*a* passes from the line *x* through the wire 270, solenoids 248, 248*a*, wires 304 and 304*a*, switches 242 and 242*a* and wires 295 and 295*a* to the line *y*.

A motor 305 is provided for shifting the movable head C to a position permitting removal of a finished tire from the drum and back to operative position, and this motor drives a shaft 306 having a crank 307 that is connected to the carriage through a rod 308, so that the carriage is moved outwardly and inwardly by a complete revolution of the shaft 306. The operation of the motor 305 is controlled by a switch 309 which is opened and closed by the shaft 15*a* of the movable head. The switch 309 is connected to the power line *x* through a wire 310, a switch 311 and a wire 312 and to a motor control solenoid 314 through a wire 313. The opposite terminal of the solenoid 314 is connected to the power line *y* through a wire 315. The solenoid 314 when energized closes two normally open switches 316 and 317 connected by wires 318 and 319 to terminals of the motor 305 and by wires 320 and 315 to power lines *x* and *y*. The carriage C carries a stop 322 that is engageable with the switch 311 at the outward limit of movement of the carriage, to open the switch 311 and stop the motor 305.

A second control switch 323 operated by the shaft 15*a* is connected through a wire 324, a limit switch 325 and wire 326 to the line *x* and through a wire 327 to solenoid 314 which is connected to the line *y* through the wire 315. The switch 323 controls the return movement of the carriage and the carriage is provided with a second stop 328 that engages with the limit switch 325 to break the motor circuit upon completion of the return movement of the carriage. The lugs operating the switches 309 and 323 are so positioned on the shaft 15*a* that the switch 309 is closed, and the carriage C is automatically retracted on the completion of the rotation of the shaft 15*a* and the switch 323 is closed to return the carriage to operative position immediately the motor 19*a* is started to begin the new cycle of operations.

After the bead rings have been built into the inner plies of fabric on the drum shoulders the outer plies of fabric together with the breaker and chaffer strips are applied in the conventional manner as the drum is turned in a forward direction under the control of the treadle 231. After the fabric has been applied the rubber cover or tread stock is applied by turning the drum rearwardly under the control of the treadle 232 and applying low pressure to the rollers 121 and 122 by shifting the control lever 268 to low pressure position. The drum is stopped by releasing the treadle 232 just before the end of the stock reaches the rollers 121 and 123 and the drum is backed up a short distance by momentarily depressing the treadle 231. The adjoining ends of the rubber stock are joined together manually and the lever 268 is shifted to high pressure position to cause the pressure rollers 121 and 122 to be pressed with high pressure against the rubber stock and to cause the stitching rollers 123, 124 and 125 and the shoulder pressing rollers 126 to be pressed with somewhat less pressure against the fabric and rubber during three or more revolutions of the drum to firmly stitch the rubber and fabric plies together and to fold the fabric plies inwardly against the exterior of the bead.

The flow regulating valve 262 is so adjusted that the movement of the plunger 153 is so slow when low pressure is applied that the rollers 123, 124, 125 and 126 are not brought into engagement with the stock on the drum during the application of the rubber cover stock G to the fabric. However, when the lever 268 is shifted to the high pressure position the rollers 123, 124, 125 and 126 are quickly brought to engaging position.

After the drum has been rotated three or four times with the pressure and stitching rollers pressed against the drum, the drum is stopped by releasing the treadle 232 after which the final operation is performed on the tire by the bead building heads.

It is to be understood that the machine herein shown in detail may be varied greatly without departing from the invention herein described and claimed.

What I claim is:

1. In combination with a tire building drum, a set of pressure applying rollers comprising a rigid tread engaging roller having a transversely convex periphery and flexible deformable rollers positioned on opposite sides of the tread engaging roller, tread shoulder engaging rollers spaced circumferentially from the pressure rollers and having conical shoulder engaging peripheries, stitching rollers mounted to engage with stock on the ends of the drum intermediate said pressure applying rolls and tread shoulder engaging rollers, and means for simultaneously yieldably pressing said rollers against stock on the drum.

2. In combination with a tire building drum, a set of pressure applying rollers comprising a rigid tread engaging roller having a transversely convex periphery and flexible deformable rollers positioned on opposite sides of the tread engaging roller, tread shoulder engaging rollers spaced circumferentially from the pressure rollers and having conical shoulder engaging peripheries, stitching rollers mounted to engage with stock on the ends of the drum intermediate said pressure applying rolls and tread shoulder engaging rollers, fluid pressure operated means for simultaneously pressing said rollers against stock on said drum, and means for varying the pressure applied to said rollers.

3. In combination with a tire building drum, a set of pressure applying rollers comprising a rigid tread engaging roller having a transversely convex periphery and flexible deformable rollers positioned on opposite sides of the tread engaging roller, tread shoulder engaging rollers spaced circumferentially from the pressure rollers and having conical shoulder engaging peripheries, stitching rollers mounted to engage with stock on the ends of the drum intermediate said pressure applying rolls and tread shoulder engaging rollers, a fluid pressure cylinder for exerting pressure upon said pressure applying rollers, a second fluid pressure cylinder for applying pressure to the stitching and tread shaping rollers, means for simultaneously supplying fluid under pressure to said cylinders, and means for retarding the flow of fluid pressure to one of said cylinders to delay the engagement of the rollers operated by the latter cylinder.

4. In combination with a tire building drum, pressure applying rollers engageable with stock on the drum substantially across the entire periphery thereof, stitcher rollers engageable with stock on the drum at the end of the drum and rearwardly of said pressure applying rollers, a fluid pressure cylinder for applying pressure to said pressure rollers, a fluid pressure cylinder for applying pressure to said stitching rollers, means for supplying fluid under pressure to said cylinders, and means for controlling said pressure supplying means to first apply pressure to said pressure applying rollers and subsequently to the pressure applying and stitching rollers simultaneously.

5. In combination with a tire building drum, pressure applying rollers engageable with stock on the drum substantially across the entire periphery thereof, stitcher rollers engageable with stock on the drum at the end of the drum and rearwardly of said pressure applying rollers, means for yieldingly pressing the rollers against stock on the drum, means for simultaneously applying fluid under pressure to said cylinders, and means for independently varying the pressure applied to the pressure rollers and to the stitching rollers.

6. In combination with a tire building drum, pressure applying rollers engageable with stock on the drum substantially across the entire periphery thereof, stitcher rollers engageable with stock on the drum at the end of the drum and rearwardly of said pressure applying rollers, a fluid pressure cylinder for applying pressure to said pressure rollers, a fluid pressure cylinder for applying pressure to said stitching rollers, a source of air under pressure, a valve controlling the supply of air to said cylinders, and a regulating valve between each cylinder and said control valve controlling the flow of fluid to each cylinder.

7. In combination with a tire building drum, a tread engaging pressure roller mounted for movement toward and away from the periphery of the drum, stitching rollers mounted for movement toward and away from the drum shoulders, a fluid pressure cylinder for moving said tread engaging roller toward the drum and applying pressure thereto, a second cylinder for moving said stitching rollers toward the drum and applying pressure thereto, means for simultaneously supplying fluid under pressure to said cylinders, and means for varying the rate of flow of fluid to each cylinder to vary the rate at which said rollers are moved toward the drum.

8. In combination with a tire building drum, a tread engaging pressure roller mounted for movement toward and away from the periphery of the drum, stitching rollers mounted for movement toward and away from the drum shoulders, a fluid pressure cylinder for moving said tread engaging roller toward the drum and applying pressure thereto, a second cylinder for moving said stitching rollers toward the drum and applying pressure thereto, a pressure supply line, means for maintaining different pressures in two different portions of said line, means for simultaneously delivering fluid under pressure to said cylinders from either of said portions of said line, and means to vary the flow of fluid to each cylinder to regulate the rates at which the rollers are moved toward the drum.

9. In combination with a tire building drum having a bead positioning shoulder, a set of stitching rollers mounted for movement radially toward and away from the drum shoulder, each of said rollers having a toothed ply engaging flange and said rollers being arranged with their flanges progressively offset axially of the drum, a spider supporting said rollers, means for pivotally supporting said spider intermediate the ends thereof, and means for yieldably pressing said spider toward said drum.

10. In combination with a tire building drum having a bead positioning shoulder, a set of stitching rollers mounted for movement radially toward and away from the drum shoulder, each of said rollers having a toothed ply engaging flange and said rollers being arranged with their flanges progressively offset axially of the drum, a supporting shaft parallel to the axis of the drum, a lever supporting said shaft for vertical movement toward and away from the drum, a spider supporting said rollers, said spider having oppositely extending arms supporting the front and rear rollers of the set and a downwardly extending arm pivoted to said shaft, means for limiting the pivotal movement of the spider with respect to the shaft, and means for exerting a yielding upward pressure on said lever to press said rollers against stock on the drum.

11. In combination with a tire building drum, pressure applying rollers engageable with stock on the drum, stitcher rollers engageable with stock on the drum at the ends thereof, a pressure roller support and a stitcher roller support both movable toward and away from said drum, a cylinder for operating the pressure roller support, a second cylinder for operating the stitcher roller support, means for simultaneously applying fluid under pressure to said cylinders, and an adjustable valve for retarding the flow of fluid to said second cylinder to delay movement of the stitcher roller support toward the cylinder.

12. In combination with a tire building drum, pressure applying rollers engageable with stock on the drum, stitcher rollers engageable with stock on the drum at the ends thereof, a pressure roller support and a stitcher roller support both movable toward and away from said drum, a cylinder for operating the pressure roller support, a second cylinder for operating the stitcher roller support, means for simultaneously applying fluid under pressure to said cylinders, a fluid pressure line connected at one end to said second cylinder to oppose movement of the stitcher roller support toward the drum, spaced pressure reducing valves in said line to provide a reduced pressure at the end connected to said second cylinder and an intermediate pressure between the valves, and means including a manually operable valve for supplying either the intermediate pressure or the full line pressure to said cylinders to press said supports toward the drum.

13. In combination with a tire building drum, pressure applying rollers engageable with stock on the drum, stitcher rollers engageable with stock on the drum at the ends thereof, a pressure roller support and a stitcher roller support both movable toward and away from said drum, a cylinder for operating the pressure roller support, a second cylinder for operating the stitcher roller support, means for simultaneously applying fluid under pressure to said cylinders, a fluid pressure line connected at one end to said second cylinder to oppose movement of the stitcher roller support toward the drum, spaced pressure reducing valves in said line to provide a reduced pressure at the end connected to said second cylinder and an intermediate pressure between the valves, means including a manually operable valve for supplying either the intermediate pressure or the full line pressure to said cylinders to press said supports toward the drum, and a retarding valve between said manually operable valve and said second cylinder to cause the movement of the stitcher roller support to lag behind the pressure roller support.

14. In combination with a tire building drum, two circumferentially spaced sets of stock engaging rollers, a support for each set of rollers movable toward and away from the drum, a lever fulcrumed intermediate its ends, an actuating connection from the lever to each of said supports, said connections being upon opposite sides of the lever fulcrum and arranged to move both supports toward the drum upon movement of the lever in one direction about tis fulcrum, and means for actuating said lever.

15. In combination with a tire building drum, first and second shafts parallel with the drum and movable toward and away from circumferentially spaced portions of the drum, a central rigid transversely convex tread engaging roller on the first shaft, flexible deformable rollers on the first shaft and spaced from opposite ends of the tread roller, a pair of conical tread shoulder engaging rollers on the second shaft circumferentially alined with the spaces between the rollers on the first shaft, and means for simultaneously pressing said rollers against stock on the drum.

16. In combination with a tire building drum, first and second shafts parallel with the drum and movable toward and away from circumferentially spaced portions of the drum, a central rigid transversely convex tread engaging roller on the first shaft, flexible deformable rollers on the first shaft and spaced from opposite ends of the tread roller, a pair of conical tread shoulder engaging rollers on the second shaft circumferentially alined with the spaces between the rollers on the first shaft, said conical rollers being movable axially on their shafts, means for limiting inward axial movements of the conical rollers, springs opposing outward axial movements of said conical rollers, and means for simultaneously pressing said rollers against stock on the drum.

17. In combination with a tire building drum, first and second shafts parallel with the drum and movable toward and away from circumferentially spaced portions of the drum, a central rigid transversely convex tread engaging roller on the first shaft, flexible deformable rollers on the first shaft and spaced from opposite ends of the tread roller, a pair of conical tread shoulder engaging rollers on the second shaft circumferentially alined with the spaces between the rollers on the first shaft, and means for applying pressure to said shafts to press said rollers simultaneously against stock on the drum and for maintaining a greater pressure on the first mentioned shaft.

WALTER J. BRETH.

REFERENCES CITED

The following references are of record in the file of this patent:

UNITED STATES PATENTS

| Number | Name | Date |
|---|---|---|
| 1,283,337 | Sikes | Oct. 29, 1918 |
| 1,465,177 | Richter | Aug. 14, 1923 |
| 1,834,559 | Waner | Dec. 1, 1931 |
| 1,966,541 | Denmire | July 17, 1934 |
| 1,970,780 | Stevens | Aug. 21, 1934 |
| 2,295,541 | Breth | Sept. 15, 1942 |
| 2,339,551 | Stevens | Jan. 18, 1944 |
| 2,342,951 | Lyle | Feb. 29, 1944 |
| 2,369,998 | Bateman | Feb. 20, 1945 |
| 2,374,391 | Sternad et al. | Apr. 24, 1945 |
| 2,381,379 | Stevens | Aug. 7, 1945 |